455-602 AU 233 EX
FIP8106 XR 3,912,951

United States Patent [19]

Kihara

[11] 3,912,951

[45] Oct. 14, 1975

[54] OPTICALLY COUPLED CIRCUIT ARRANGEMENT

[75] Inventor: Kuniaki Kihara, Tokyo, Japan

[73] Assignee: Nippon Electric Company, Limited, Tokyo, Japan

[22] Filed: Apr. 19, 1974

[21] Appl. No.: 462,569

[30] Foreign Application Priority Data

Apr. 19, 1973 Japan ................................ 48-43609

[52] U.S. Cl. ................ 307/289; 250/199; 250/551; 307/311

[51] Int. Cl.² ...................... H03K 3/29; G02B 27/00

[58] Field of Search ................ 250/199, 211 J, 551; 330/112; 307/291, 292, 289, 311

[56] References Cited

UNITED STATES PATENTS

| | | | |
|---|---|---|---|
| 2,404,696 | 7/1946 | Deal | 250/199 |
| 3,436,548 | 4/1969 | Biard et al. | 250/551 |
| 3,462,606 | 8/1969 | Case | 307/289 |
| 3,742,947 | 7/1973 | Hashem | 250/199 |
| 3,811,094 | 5/1974 | Lee | 330/59 |

OTHER PUBLICATIONS

Signetics Integrated Circuits, 1972, pp. 2–289.

*Primary Examiner*—George H. Libman
*Attorney, Agent, or Firm*—Sughrue, Rothwell, Mion, Zinn & Macpeak

[57] ABSTRACT

An electro-optical network having two electrically isolated units which are optically coupled by means of two optical couplers each comprising a light-emitting diode and a phototransistor positioned in light-coupled relationship to the diode. One of the optical couplers is used for signal transmission between the two units, the other coupler providing a positive feedback path for the transmitted signal. This positive feedback arrangement serves to improve the switching speed of the output side of the network, resulting in increased signal transmission speed.

1 Claim, 3 Drawing Figures

OPTICALLY COUPLED CIRCUIT ARRANGEMENT

BACKGROUND OF THE INVENTION

The present invention relates to an optically coupled circuit arrangement employing optically coupled isolators.

In general, such type of optically coupled circuit arrangements are used in the case of a circuit transmitting signals from the input side to the output side and requiring electrical isolation between the input side and the output side.

Accordingly, in such an optically coupled circuit arrangement, it is a common practice to couple the input side to the output side through an optically coupled isolator having a light-emitting section and a light-receiving section and to use said optically coupled isolator in a switching mode.

However, the switching speed of the conventionally used optically coupled isolators is extemely slow in comparison to the switching speed of the peripheral electronic circuits to be used on the input side and the output side. Consequently, there occurs a delay in the signal transmission speed, which results in signal distortion.

Heretofore, various techniques of reducing the above-described effects caused by the low switching speed of the optically coupled isolator have been proposed, including a method in which a PIN diode is employed in the light-receiving section to enhance the switching speed of the optically coupled isolator per se, and a method in which a flip-flop circuit or the like providing positive feedback is employed on the output side of the optically coupled isolator to achieve speed-up of the switching by the intermediary of an external circuit.

However, the former method has the disadvantage that the output current derived from the PIN diode is of the order of only several tens of micro-amperes, and so a sufficient output cannot be obtained unless the PIN diode is used in combination with a high speed operational amplifier. In addition, the former method is expensive to carry out because it necessitates an optically coupled isolator employing a PIN diode and an operational amplifier or the like.

On the other hand, the switching speed in the case of the latter method is limited by the switching speed of the optically coupled isolator per se.

It is an object of the present invention to provide an optically coupled circuit arrangement which can improve the switching speed of an optically coupled isolator, and also which is inexpensive to manufacture.

SUMMARY OF THE INVENTION

According to the present invention, there is provided an improved optically coupled circuit arrangement having a positive feedback loop which affects optical coupling from the output side to the input side of an optically coupled isolator provided as a main transmission path without adversely affecting the electrically isolated condition between the input and output circuit of the optically coupled circuit arrangement, whereby the switching speed of the optically coupled isolator may be enhanced.

In more detail, according to the present invention, there is provided an optically coupled circuit arrangement comprising an optically coupled isolator providing a main signal transmission path from the input side to the output side while maintaining electrical isolation therebetween, and an additional optically coupled isolator for providing positive feedback from said output side to said input side while maintaining electrical isolation therebetween.

DETAILED DESCRIPTION OF THE PREFERRED EMBODIMENTS

Figure 1:
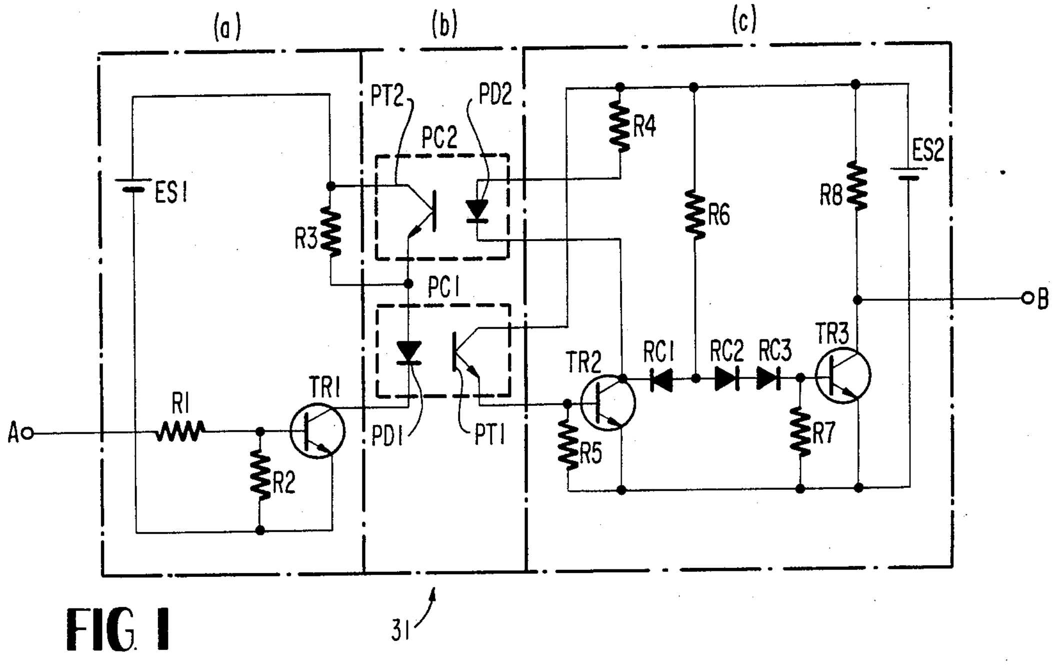
FIG. 1 is a circuit diagram showing one preferred embodiment of the present invention.

Referring to FIG. 1, there are provided a driver circuit section (*a*) forming an input circuit, and a detector circuit section (*c*) forming an output circuit, and these circuit sections are coupled by an optical coupling section (*b*). The driver circuit section (*a*) comprises a transistor TR1 having an input terminal A, and a power supply $E_{S1}$, while the detector circuit section (*c*) comprises transistors TR2 and TR3 and a power supply $E_{S2}$, the collector of the transistor TR3 being connected to an output terminal B.

The optical coupling section (*b*), which couples the driver circuit section (*a*) to the detector circuit section (*c*) while maintaining electrical isolation therebetween, is provided with two optically coupled isolators PC1 and PC2. Of these isolators, the optically coupled isolator PC1 forms an optically coupled isolator for use as a main signal transmission path, in which a light-emitting diode PD1 is disposed in a light-emitting section provided on the driver circuit side, while a phototransistor PT1 is disposed in a light-receiving section provided on the detector circuit side. On the other hand, the optically coupled isolator PC2 forms an opticallly coupled isolator for providing positive feedback, in which on the driver circuit side is disposed a phototransistor PT2, while on the detector circuit side is disposed a light-emitting diode PD2.

Assuming now that a positive potential is applied to the input terminal A, the transistor TR1 is turned ON, whereby a current $I_{F1}$ is fed to the optical coupling section (*b*) through a resistor R3. This current $I_{F1}$ causes the light-emitting diode PD1 in said isolator PC1 to be turned to a light-emitting state. Representing, the transmission efficiency of the optically coupled isolator PC1 by $\beta 1$, the current flowing in the phototransistor PT1 of the optically coupled isolator PC1 is $\beta_1 I_{F1}$ . Hence, the transistor TR2 is turned ON and the transistor TR3 is turned OFF. When the transistor TR2 is turned ON, a current of $I_{F2}$ flows through a resistor R4 into a light-emitting diode PD2 provided in the optically coupled isolator PC2. Representing the transmission efficiency of the optically coupled isolator PC2 by $\beta_2$, a current of $\beta_2 I_{F2}$ flows from the collector to the emitter of phototransistor PT2, resulting in an increase of the current through the light-emitting diode PD1 in the optically coupled isolator PC1. Accordingly, the current of $\beta_1 I_{F1}$ in the optically coupled isolator PC1 is progressively increased, so that the transistor TR2 conducts more heavily.

Owing to the positive feedback effect provided through the optically coupled isolator PC2, the speed of turning ON transistor TR2 and turning OFF transistor TR3, that is, the speed of transition in one direction of each transistor is greatly improved.

Figure 2:
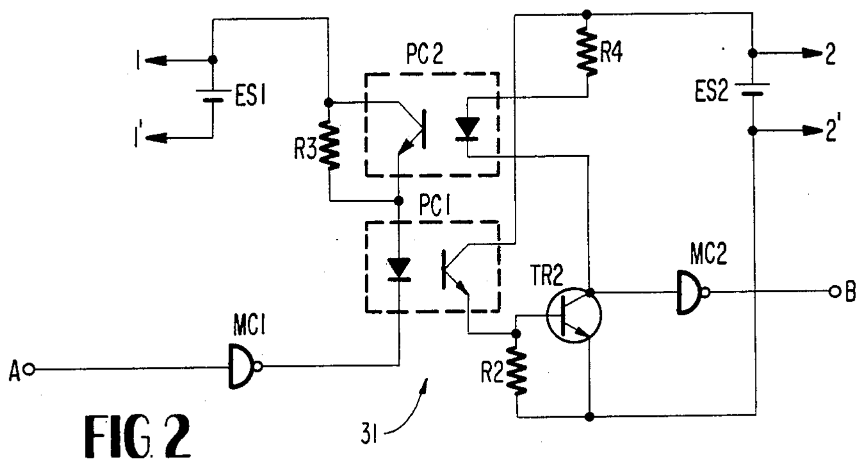
FIG. 2 is a circuit diagram showing another embodiment of the present invention.

FIG. 2 is a circuit diagram showing another embodiment of the present invention, which is particularly suitable for integrated circuit construction. In this figure, NAND circuits MC1 and MC2 are used in place of the transistors TR1 and TR3 respectively. In this embodiment also, there are provided an optically coupled isolator PC1 for use as a main signal transmission path and another optically coupled isolator PC2 for providing positive feedback, so that owing to the positive feedback effect through the optically coupled isolator PC2, transitions in one direction of the transistor TR2 and the NAND circuit MC2 (transitions either from ON to OFF or from OFF to ON) can be achieved quickly. In addition, by connecting the respective terminals 1—1' of the power supply $E_{S1}$ on the driver circuit side to the power supply terminals of the NAND circuit MC1, and by connecting the respective terminals 2—2' of the power supply $E_{S2}$ on the detector circuit side to the power supply terminals of the NAND circuit MC2, it is possible to use the power supplies $E_{S1}$ and $E_{S2}$ in common with the NAND circuits.

Figure 3:
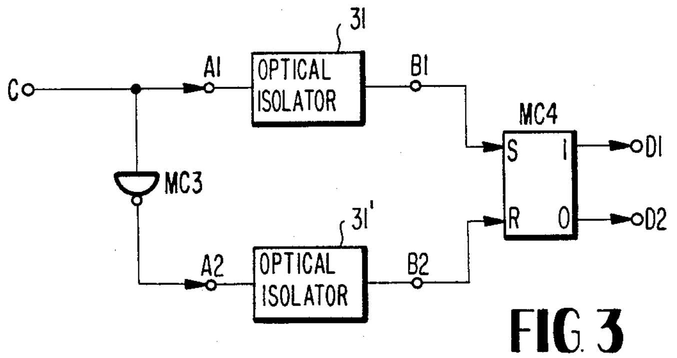
FIG. 3 is a block diagram showing still another embodiment of the present invention.

Referring to FIG. 3 which shows still another embodiment of the present invention there are connected to an input terminal C directly and via a NAND circuit MC3 the input terminals $A_1$ and $A_2$ of a pair of optically coupled circuit arrangements 31 and 31' respectively, which have the same circuit construction as that illustrated in FIG. 1 or FIG. 2. On the other hand, the respective output terminals $B_1$ and $B_2$ of the optically coupled circuit arrangements 31 and 31' are connected to the set terminal S and the reset terminal R, respectively, of a flip-flop circuit MC4. A true-value output is obtained at the terminal $D_1$ of this flip-flop MC4, while a complementary-value output is obtained at the terminal $D_2$. The flip-flop circuit MC4 is used as a circuit which is capable of being actuated when the set or reset input is changed from its lower level to its higher level. In the circuit arrangement as described above, by combining two circuit arrangements, each of which has a high transition speed in one direction, only the high speed transition portions of the respective circuit arrangements are utilized, so that it is possible to form as a whole an optically coupled circuit arrangement which can be switched at a high speed either in the ON to OFF or OFF to ON direction.

What is claimed is,

1. An isolation network for first and second electric circuits, comprising:

a pair of electro-optical isolators, each isolator comprising a first optical coupler, first circuit means for coupling the input of said isolator in an operable relationship to the input of said first optical coupler, a second optical coupler, second circuit means for coupling the output of said first optical coupler in an operable relationship to the output of the isolator and to the input of said second optical coupler, the output of said second optical coupler being coupled to the input of said first optical coupler in a manner to provide positive feedback thereto, the input of one of said electro-optical isolators being connected to the output of said first electric circuit, an inverter circuit connected between the output of said first electric circuit and the input of the other electro-optical isolator, and a bistable circuit having two inputs connected to the respective outputs of said electro-optical isolators, the output of said bistable circuit being connected to said second electric circuit.

* * * * *